United States Patent [19]

Homan et al.

[11] 4,281,094
[45] Jul. 28, 1981

[54] NOVEL MERCAPTOORGANOPOLYSILOXANES

[75] Inventors: Gary R. Homan; Jan M. Blevins, both of Midland, Mich.

[73] Assignee: Dow Corning Corporation, Midland, Mich.

[21] Appl. No.: 171,622

[22] Filed: Jul. 23, 1980

Related U.S. Application Data

[63] Continuation-in-part of Ser. No. 99,303, Dec. 3, 1979, abandoned.

[51] Int. Cl.³ .............................................. C08G 77/22
[52] U.S. Cl. ........................................ 528/30; 528/32; 528/34; 528/37; 528/40; 556/427; 556/467
[58] Field of Search ....................... 528/30, 32, 34, 37, 528/40; 556/427, 467

[56] References Cited

U.S. PATENT DOCUMENTS

| | | | |
|---|---|---|---|
| 4,046,795 | 9/1977 | Martin | 528/30 |
| 4,113,696 | 9/1978 | Williams et al. | 528/30 |
| 4,151,157 | 4/1979 | Williams | 528/30 |
| 4,230,816 | 10/1980 | Martin | 528/12 |
| 4,238,393 | 12/1980 | Takamizawa et al. | 528/30 |

Primary Examiner—Melvyn I. Marquis
Attorney, Agent, or Firm—Roger H. Borrousch

[57] ABSTRACT

Organopolysiloxanes which contain aliphatic unsaturation and silicon-bonded alkoxy groups where the alkoxy groups are present in the form of units such as

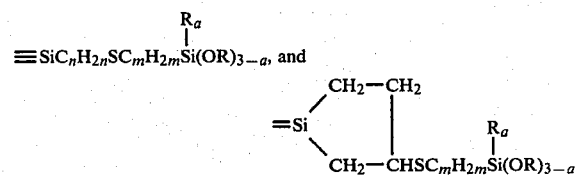

wherein n is 2 to 4, m is 1 to 6, a is 0 or 1 and R is lower alkyl are useful as adhesion promoters for silicone elastomers.

5 Claims, No Drawings

NOVEL MERCAPTOORGANOPOLYSILOXANES

This is a continuation-in-part of application Ser. No. 099,303, filed Dec. 3, 1979 and now abandoned.

BACKGROUND OF THE INVENTION

1. Field of the Invention

The present invention relates to novel sulfur-containing siloxane compounds and to compositions including such compounds which are useful as additives for promoting adhesion of silicone elastomers to substrates.

2. Description of the Prior Art

Adhesion of silicone elastomers, e.g., sealant compositions, to substrate surfaces has been the subject of substantial research and developmental work in the past. Of particular concern has been the enhancement of adhesion characteristics for elastomers formed by the platinum catalyzed reaction of vinyl siloxane polymers and SiH group containing materials which proceeds according to the generalized reaction:

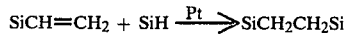

SUMMARY OF THE INVENTION

The present invention relates to organopolysiloxanes having both alkoxy and aliphatically unsaturated functional groups, which organopolysiloxanes are useful as adhesion promoters for elastomers formed by the platinum catalyzed reaction of vinyl siloxane polymers and SiH group containing compounds.

Incorporated by reference herein in U.S. patent application Ser. No. 099,300, by Gary R. Homan and Chi-Long Lee, filed Dec. 3, 1979 and entitled "Mercaptoorganopolysiloxane and Curable Compositions Including Same" and U.S. patent application Ser. No. 099,251, by Gary R. Homan and Louis H. Toporcer, filed Dec. 3, 1979 and entitled "Novel Mercaptoorganosiloxanes."

DESCRIPTION OF THE INVENTION

The compounds of the present invention are organopolysiloxanes consisting essentially of a combination of units having at least three and no more than one hundred diorganosiloxane units per molecule wherein the units of the combination of the siloxane units forming the molecule are selected from the group consisting of:
units of the formula,

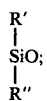

units of the formula,

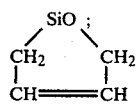

alkoxy containing units of the formula,

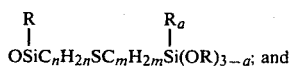

alkoxy containing units of the formula

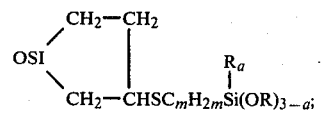

and any endblocking units present being selected from the group consisting of:
units of the formula,

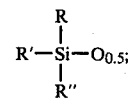

units of the formula,

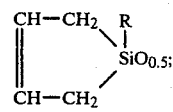

alkoxy containing units of the formula,

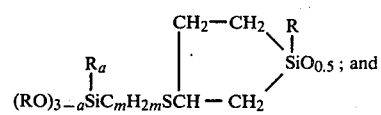

alkoxy containing units of the formula,

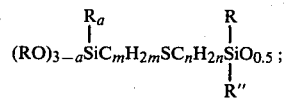

wherein R is a lower ($C_1$ to $C_3$) alkyl radical, R' is a lower ($C_1$ to $C_3$) alkyl, aryl or lower ($C_2$ to $C_3$) alkenyl radical; R" is a lower ($C_1$ to $C_3$) alkyl or aryl radical; a is either 0 or 1; n is from 2 to 4 inclusive; m is from 1 to 6 inclusive; and wherein said compound includes at least one aliphatically unsaturated unit and at least one alkoxy containing unit. In preferred organopolysiloxanes of the present invention, R and R" are methyl radicals while R' is selected from the group consisting of methyl and vinyl radicals. The phrases "lower" and/or "($C_1$ to $C_3$)" used in reference to alkyl radical mean alkyl radicals having one to three carbon atoms including methyl, ethyl and propyl. "Lower" and/or "($C_2$ to $C_3$)" used in reference to alkenyl mean alkenyl radicals having two to three carbon atoms including vinyl and allyl.

One convenient method of preparing the compounds of the present invention is by mixing an aliphatically unsaturated polydiorganosiloxane having at least two unsaturated groups with a mercaptoalkyl alkoxysilane in the presence of a free radical initiator. Examples of aliphatically unsaturated polydiorganosiloxanes which are suitable for use in preparing the organopolysiloxanes of the present invention can be represented by the structural formula:

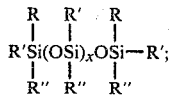

and cyclic compounds represented by the structural formula,

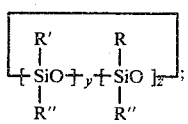

wherein R, R' and R" are as described previously, x is from 1 to 100, and the sum of y+z is from 3 to 8. In the aliphatically unsaturated polydiorganosiloxanes which are used to prepare the preferred organopolysiloxanes of the present invention, R and R" are methyl radicals and R' is selected from the group consisting of methyl and vinyl radicals. Cyclic polymethylvinylsiloxanes are especially preferred.

Mercaptoalkyl alkoxysilanes which are suitable for use in preparing the organopolysiloxanes of the present invention are represented by the formula,

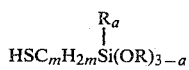

wherein a, m and R are as defind previously.

Suitable free radical initiators are well known and include ultraviolet light, transition metal salts of carboxylic acids such as ferric octoate, peroxides, and Vazo ®64, a diazo vinyl polymerization catalyst sold by E. I. DuPont.

The organopolysiloxanes of the invention can be utilized as components of primers which are applied to surfaces prior to application of an elastomeric composition or they can be incorporated directly into an elastomeric composition, in which case the organopolysiloxanes also extend the time available for shaping, molding or otherwise working the compositions.

It is to be understood that all compounds of the present invention contain at least one alkoxy containing unit and at least one aliphatically unsaturated unit.

Example 1 illustrates the need for adhesion promoters such as those provided by the present invention.

EXAMPLE 1

One part of a two-part elastomeric composition was prepared by mixing 53.67 parts by weight of a methylphenylvinylsiloxy, endblocked polydimethylsiloxane represented by the average formula,

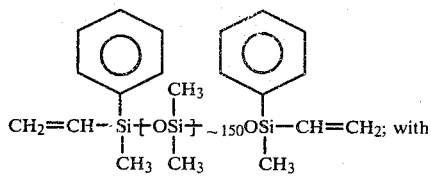

38.96 parts of quartz ground to an average particle size of 5 microns; 7.08 parts of a mixture of 12 parts of the polydimethylsiloxane above, 2 parts zinc oxide and 1 part of lampblack; and 0.29 parts of a platinum catalyst prepared according to U.S. Pat. No. 3,419,593 to Willing.

The other part of the two-part composition was prepared by mixing 54.44 parts of the methylphenylvinylsiloxy endblocked polydimethylsiloxane above; 38.96 parts of quartz ground to an average particle size of 5 microns; and 6.60 parts of a siloxane having 20 mol percent trimethylsiloxy units, 30 mol percent dimethylsiloxane units and 50 mol percent methylhydrogensiloxane units and having 0.76 weight percent silicon-bonded hydrogen atoms. After equal portions of the two parts were mixed, a thin layer of the resulting composition was sandwiched between two aluminum plates which had been cleaned with 1,1,1-trichloroethane. While sandwiched, the elastomer was cured at 120° C. for 3 hours. Upon cooling, the shear that the assembly was capable of sustaining was measured by pulling the plates in opposite directions in their planes. This "lap shear" test was performed on three samples yielding ultimate shears of 0.26, 0.28, and 0.40 MPa. Upon inspection of the samples after the elastomer had failed, it was found in the first two cases that all of the elastomer remained on one plate and the other plate was devoid of any elastomer. This is termed 0% cohesive failure and indicates that the bond of the elastomer to the metal is very much weaker than the yield strength of the elastomer in shear. In the third case, the layer of elastomer itself had sheared over 13% of the original one square inch area on the plate and had separated from one plate or the other over the remainder of the area. This is termed 13% cohesive failure and indicates a low degree of adhesion of the elastomer to the plate.

Example 2 indicates the preparation of a vinyldimethylsiloxy endblocked polymethylvinylsiloxane which is useful in synthesizing the compounds of the present invention.

EXAMPLE 2

A vinyldimethylsiloxy endblocked polymethylvinylsiloxane was prepared in a round bottom flask equipped with a Teflon ® coated magnetic stirrer by mixing 100 parts by weight of a hydroxy endblocked polymethylvinylsiloxane, represented by the average formula

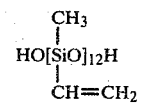

with 29 parts by weight of vinyldimethyl-(N-methylacetamide)-silane which were slowly added to the flask while maintaining a controlled exotherm. The resulting composition was stirred at room temperature for four days, stripped for an hour at 85° C. at a pressure less than 267 Pa, then cooled overnight without stirring. The composition separated into an upper phase of brown crystals and a lower yellow liquid phase. The yellow liquid, which had the average structure

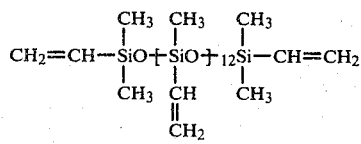

was recovered by cooling the composition in an ice bath and removing the solids by filtration.

Example 3 illustrates the formulation of an organopolysiloxane of the present invention.

EXAMPLE 3

An adhesion promoter was prepared in a condenser equipped round bottom flask having a magnetic stirrer by placing 75 parts by weight of the vinyldimethylsiloxy endblocked polymethylvinylsiloxane as prepared in Example 2 in the flask; then adding about 10 parts by weight of gamma-mercaptopropyltrimethoxysilane followed by one drop of 50 weight percent ferric octoate in mineral oil. More gamma-mercaptopropyltrimethoxysilane was added slowly while maintaining a controlled exotherm at about 45° C. until a total of 34.75 parts by weight had been added. The composition was allowed to cool overnight with constant stirring. The resulting organopolysiloxane contained about three siloxane units per molecule which had a silicon-bonded group of the formula $$-C_2H_4SC_3H_6Si(OCH_3)_3.$$

Examples 4 and 5 illustrate the use of compounds of the present invention and also illustrate that the compound of Example 3 is an excellent adhesion promoter.

EXAMPLE 4

The organopolysiloxane prepared in Example 3 was incorporated into the two-part composition of Example 1 in an amount equal to 0.5% of the total weight of the elastomer.

Upon performance of the lap shear test as in Example 1, it was found that the elastomer was capable of sustaining a shear of 2.05 MPa, and that the bonding of the elastomer to the aluminum was of such strength that, upon failure, the elastomer sheared through its center leaving layers of elastomer covering the bonded area on each plate. This type of failure is termed 100% cohesive failure and indicates the highest degree of adhesion promotion. Similar results were obtained with anodized aluminum and stainless steel substrates. The elastomer did not adhere to polycarbonate polymer.

EXAMPLE 5

The procedure of Example 4 was repeated using 0.25 weight percent of the organopolysiloxane of Example 3. The lap shear test showed that the resulting elastomer was capable of sustaining 1.65 MPa and that the failure was 100% cohesive.

EXAMPLE 6

The procedure of Example 3 was repeated using 100 parts of polymethylvinylsiloxane cyclics (primarily tetramer); and 56.84 parts of gamma-mercaptopropyl-trimethoxysilane. The average structure of the resulting polymer can be represented as

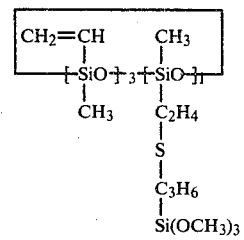

EXAMPLE 7

The procedure of Example 4 was repeated using the adhesion promoter of Example 6 at levels of 0.5 weight percent and 0.1 weight percent. At 0.5 weight percent the lap shear test showed that the resulting elastomer was capable of sustaining a shear of 1.98 MPa. At 0.1 weight percent the elastomer could sustain 1.07 MPa. In both cases, failure was 100% cohesive.

That which is claimed is:

1. As a composition of matter, an organopolysiloxane consisting essentially of a combination of units having at last three and no more than one hundred diorganosiloxane units per molecule wherein the units of the combination of siloxane units forming the molecule are selected from the group consisting of:

units of the formula,

units of the formula,

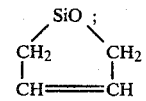

alkoxy containing units of the formula,

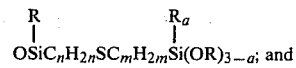

alkoxy containing units of the formula

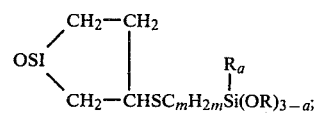

and any endblocking units present being selected from the group consisting of
units of the formula,

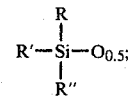

units of the formula, $$\begin{matrix} CH-CH_2 & R \\ \| & | \\ & Si O_{0.5}; \\ CH-CH_2 & \end{matrix}$$

alkoxy containing units of the formula, $$\begin{matrix} & CH_2-CH_2 & R \\ R_a & | & | \\ | & & SiO_{0.5} \\ (RO)_{3-a}SiC_mH_{2m}SCH-CH_2 & \end{matrix}$$

and alkoxy containing units of the formula $$\begin{matrix} R_a & & R \\ | & & | \\ (RO)_{3-a}SiC_mH_{2m}SC_nH_{2n}SiO_{0.5} \\ & & | \\ & & R'' \end{matrix}$$

wherein R is a lower alkyl radical; R' is a lower alkyl, aryl or lower alkenyl radical; R" is a lower alkyl or aryl radical; a is either 0 or 1; n is from 2 to 4 inclusive; m is from 1 to 6 inclusive; and wherein said compound includes at least one alkoxy containing unit and at least one aliphatically unsaturated unit.

2. The organopolysiloxane of claim 1 wherein R and R" are methyl radicals and R' is chosen from the group consisting of methyl and vinyl radicals.

3. The organopolysiloxane according to claim 1 in which the organopolysiloxane is represented by the average formula $$\begin{bmatrix} CH_2=CH & CH_3 \\ | & | \\ SiO \end{bmatrix}_3 \begin{bmatrix} SiO \\ | \\ C_2H_4 \\ | \\ S \\ | \\ C_3H_6 \\ | \\ Si(OCH_3)_3 \end{bmatrix}$$

4. An organopolysiloxane formed by reacting, in the presence of a free radical initiator
 (A) an aliphatically unsaturated polydiorganosiloxane having at least two unsaturated groups and being selected from the group consisting of:
 (1) compounds represented by the structural formula $$\begin{matrix} R & R' & R \\ | & | & | \\ R'-Si(OSi)_xOSi-R'; \\ | & | & | \\ R'' & R'' & R'' \end{matrix}$$

and (2) cyclic compounds represented by the structural formula $$\begin{bmatrix} R' & R \\ | & | \\ SiO]_y[SiO]_z \\ | & | \\ R'' & R'' \end{bmatrix}$$

wherein R is a lower alkyl radical, R' is a lower alkyl, aryl or lower alkenyl radical, R" is a lower alkyl or aryl radical, x is from 1 to 100 and the sum of y+z is from 3 to 8, with
 (B) a mercaptoalkoxysilane represented by the structural formula $$\begin{matrix} R_a \\ | \\ HSC_mH_{2m}Si(OR)_{3-a} \end{matrix}$$

wherein R is a lower alkyl radical, m is from 1 to 6 inclusive and a is 0 or 1.

5. The organopolysiloxane of claim 4 wherein said aliphatically unsaturated polydiorganosiloxane is a cyclic polymethylvinylsiloxane.

* * * * *

UNITED STATES PATENT AND TRADEMARK OFFICE
CERTIFICATE OF CORRECTION

PATENT NO. : 4,281,094

DATED : July 28, 1981

INVENTOR(S) : Gary R. Homan and Jan M. Blevins

It is certified that error appears in the above-identified patent and that said Letters Patent are hereby corrected as shown below:

In Column 8, line 39; the word "mercaptoalkoxysilane" should read "mercaptoalkylalkoxysilane".

Signed and Sealed this

Twentieth Day of October 1981

[SEAL]

Attest:

GERALD J. MOSSINGHOFF

Attesting Officer

Commissioner of Patents and Trademarks